(12) United States Patent
Nishida et al.

(10) Patent No.: US 7,811,501 B2
(45) Date of Patent: Oct. 12, 2010

(54) MOLD, METHOD OF PRODUCING THE MOLD, AND METHOD OF PRODUCING MOLDED ARTICLE USING THE MOLD

(75) Inventors: Tetsuaki Nishida, Fukuoka (JP); Ken-ichi Kobayashi, Tokyo (JP); Akira Morishige, Ayase (JP)

(73) Assignee: Kitakyushu Foundation for the Advancement of Industry, Science and Technology, Kitakyushu-shi (JP)

( * ) Notice: Subject to any disclaimer, the term of this patent is extended or adjusted under 35 U.S.C. 154(b) by 383 days.

(21) Appl. No.: 11/661,992

(22) PCT Filed: Sep. 5, 2005

(86) PCT No.: PCT/JP2005/016252

§ 371 (c)(1),
(2), (4) Date: Mar. 6, 2007

(87) PCT Pub. No.: WO2006/028052

PCT Pub. Date: Mar. 16, 2006

(65) Prior Publication Data

US 2008/0303193 A1  Dec. 11, 2008

(30) Foreign Application Priority Data

Sep. 6, 2004 (JP) .................. 2004-258963

(51) Int. Cl.
*B29C 33/38* (2006.01)
*C01G 31/02* (2006.01)
(52) U.S. Cl. .............. 264/337; 249/135; 216/94; 423/594.17; 423/594.2
(58) Field of Classification Search ............. 264/337; 249/134–135; 216/94; 423/594.17, 594.2
See application file for complete search history.

(56) References Cited

U.S. PATENT DOCUMENTS

| | | | | |
|---|---|---|---|---|
| 5,149,974 A | * | 9/1992 | Kirch et al. | 250/492.2 |
| 6,309,545 B1 | * | 10/2001 | Penth et al. | 210/500.25 |
| 2003/0186059 A1 | * | 10/2003 | Hirata et al. | 428/408 |

FOREIGN PATENT DOCUMENTS

| | | | |
|---|---|---|---|
| JP | 2003-34548 | | 2/2003 |
| JP | 2004-2181 | | 1/2004 |
| JP | 2004-002181 | * | 1/2004 |
| JP | 2004-034194 | * | 2/2004 |
| JP | 2004-34194 | | 2/2004 |

* cited by examiner

*Primary Examiner*—Kat Wyrozebski
*Assistant Examiner*—Scott W Dodds
(74) *Attorney, Agent, or Firm*—Edwards Angell Palmer & Dodge LLP

(57) ABSTRACT

A mold which is processed by ion beam irradiation or electron beam irradiation and in which a throughput of the mold is high and a decrease in the throughput or electrostatic discharge due to charging does not occur, a method of producing the mold, and a method of producing a molded article produced using the mold. When molding a plastic resin, at least one of a cavity and a core is provided on the surface of a conductive glass substrate. A method of producing a mold for molding a plastic resin or the like includes forming at least one of a cavity and a core by irradiating an ion beam on the surface of a conductive vanadate glass substrate that contains vanadium pentoxide ($V_2O_5$) as a main component and that has an electric conductivity in the range of $1.0 \times 10^{-1}$ to $1.0 \times 10^{-8}$ S/cm.

10 Claims, 1 Drawing Sheet

MOLD, METHOD OF PRODUCING THE MOLD, AND METHOD OF PRODUCING MOLDED ARTICLE USING THE MOLD

BACKGROUND OF THE INVENTION

1. Field of the Invention

The present invention relates to a mold for molding a plastic resin or the like, the mold having a fine structure composed of at least one of a cavity and a core on the micrometer order, or preferably the nanometer order, a method of producing the mold, and a method of producing a molded article using the mold.

2. Description of the Related Art

With recent development of nanotechnologies, molded articles having a fine structure have been used in various fields. For example, molded articles having a fine structure, such as a semiconductor circuit, a DNA chip substrate, a nozzle of an ink-jet head, and a sensor have been used. These molded articles require high dimensional accuracy. For example, a smaller nozzle diameter of an ink-jet head allows a large amount of information to be processed. Molded articles constituting a micromachine component also require a fine structure having a high dimensional accuracy.

Hitherto, in the field of die, dies are processed by electric discharge machining, and dies having a fine structure with a size on the order of 5 to 10 μm have been produced. However, for example, in order to produce molded articles constituting components of micromachines, a mold such as a die that is subjected to an ultra-micromachining on the order of 1 μm or less is required. A processing method using ion beam irradiation has been tried as processing means for performing, on a mold material, a micromachining of such a fine size, which exceeds the limit of the processing accuracy of the electric discharge machining (see, for example, Japanese Unexamined Patent Application Publication No. 2004-034194).

In the processing method using ion beam irradiation, a throughput (process efficiency) is significantly changed in accordance with combinations of a metallic material to be processed and an ion atom. In addition, the irradiated ion must have energy sufficient to satisfactorily knock off atoms of the metal to be processed by collision. Furthermore, for example, when a mold is produced by processing copper (Cu) by Ga ion irradiation, it takes a very long time and effort. For example, when a cubic cavity having ten micrometer sides is formed on a copper (Cu) material with a focused ion irradiation device in which Ga ions are accelerated at 30 kV, a processing time in the range of several hours to ten hours is required.

SUMMARY OF INVENTION

Problems to be Solved by the Invention

When a mold is made of a material containing a Si atom as a main component, for example, glass, a satisfactory throughput can be achieved. However, as ion beam irradiation proceeds, the glass is charged, resulting in not only a significant decrease in the throughput by the ion beam irradiation but also degradation of the processing accuracy. If the operation is further continued, electrostatic discharge is caused in the glass material.

It is an object of the present invention to provide a mold which is processed by ion beam irradiation and in which a throughput of the mold is high and a decrease in the throughput or electrostatic discharge due to charging does not occur, a method of producing the mold, and a method of producing a molded article produced using the mold.

Means for Solving the Problems

In order to solve the above problems, a mold according to the present invention includes a substrate made of a conductive vanadate glass containing vanadium pentoxide ($V_2O_5$) as a main component, and at least one of a cavity and a core formed by irradiating an ion beam of an atom having an atomic weight larger than the atomic weight of vanadium (V) on the surface of the substrate.

According to this structure, by using a conductive glass, ultra-micromachining on the micrometer order to the nanometer order can be performed within a relatively short time without causing a decrease in the throughput or electrostatic discharge due to charging. Accordingly, a high-quality mold suitable for mass production can be produced.

Here, an ion beam of Cr, Fe, Ga, As, Br, Kr, Mo, In, Ba, W, or Au can be used as the ion beam. In particular, when a Ga ion is used as the ion beam, the irradiation energy is preferably controlled in the range of 5 to 50 keV from the standpoint that a high throughput can be achieved and electrostatic discharge does not occur.

In the mold of the present invention, the electric conductivity of the substrate may be in the range of $1.0 \times 10^{-1}$ to $1.0 \times 10^{-8}$ S/cm.

When the electric conductivity of the substrate is within the above range, the substrate has an effective conductivity that does not cause electrostatic discharge during ion beam processing, and characteristics of a glass material can be stably obtained.

When the electric conductivity is less than $1.0 \times 10^{-8}$ S/cm, it tends to be difficult to maintain a state in which the substrate has an effective conductivity and electrostatic discharge does not occur during ion processing. In particular, in the case of a Ga ion, it is known from experimental results that the lower limit of the electric conductivity of a glass for realizing a processing on the nanometer order at a current in the range of picoampere (pA) without causing electrostatic discharge is on the order of $10^{-8}$. On the other hand, when the electric conductivity exceeds $1.0 \times 10^{-1}$ S/cm, it tends to be difficult to maintain a certain shape in the form of a glass material and to stably obtain such a predetermined shape.

In the mold of the present invention, a vanadate glass further including ferric oxide ($Fe_2O_3$) and barium oxide (BaO) as components, in addition to vanadium pentoxide ($V_2O_5$), may be used as the conductive vanadate glass.

In this case, from the standpoint of processability, an ion beam of Cr, Fe, Ga, As, Br, Kr, Mo, In, Ba, W, or Au is particularly preferably used as the charged-particle beam used for forming the cavity and the core.

A method of producing a mold according to the present invention includes forming at least one of a cavity and a core by irradiating an ion beam of an atom having an atomic weight larger than the atomic weight of vanadium (V) on the surface of a substrate made of a conductive vanadate glass containing vanadium pentoxide ($V_2O_5$) as a main component.

Examples of elements that can be used for the ion beam include Cr, Fe, Ga, As, Br, Kr, Mo, In, Ba, W, and Au.

In the method of producing a mold according to the present invention, a conductive vanadate glass having an electric conductivity in the range of $1.0 \times 10^{-1}$ to $1.0 \times 10^{-8}$ S/cm may be used as the substrate.

In the method of producing a mold according to the present invention, a conductive vanadate glass further containing ferric oxide ($Fe_2O_3$) and barium oxide (BaO) as components, in addition to vanadium pentoxide ($V_2O_5$), may be used as the substrate.

In the method of producing a mold according to the present invention, the ion atom of the ion beam may be a Ga ion.

When Ga is used as the ion beam, from the standpoint of processability, phosphorus or oxygen is preferably used as a component contained in the substrate.

A method of producing a molded article according to the present invention includes filling a polymer, a polymer precursor, a biopolymer, a sol or gel substance, or a mixture thereof that is dissolved or dispersed in a solvent in the above mold of the present invention.

According to the mold of the present invention, a mold for molding a plastic resin or the like, the mold being composed of at least one of a cavity and a core having a high dimensional accuracy, can be provided.

According to the method of producing a mold of the present invention, a method of producing a mold for molding a plastic resin or the like in which a decrease in the throughput or electrostatic discharge with the progress of ion beam irradiation does not occur and which is made of a glass substrate can be provided.

The invention described in claim 8 can provide a method of producing a mold for molding a plastic resin or the like, the mold being made of a glass substrate, using ion beam irradiation with a high throughput of the mold.

The invention described in claim 9 can provide a molded article of a plastic resin or the like having a high dimensional accuracy.

Figure 1:
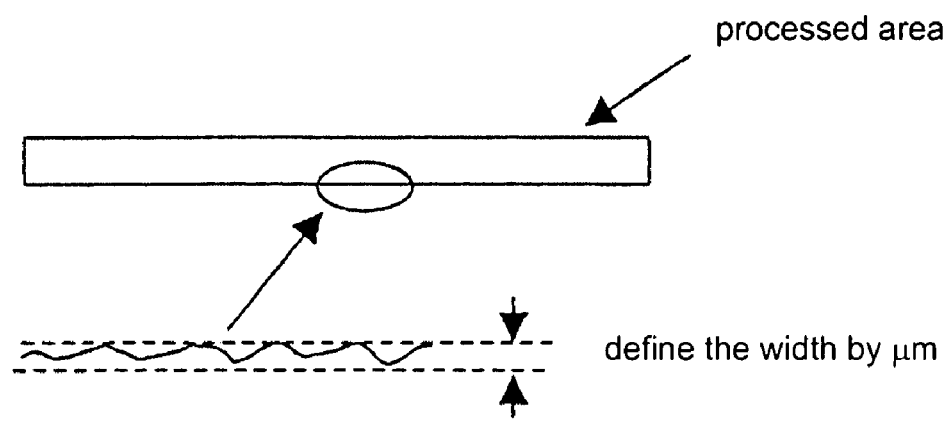
FIG. 1 includes schematic views illustrating the definition of surface roughness for comparing the surface roughness of a mold according to an example of the present invention with that according to comparative examples.

REFERENCE NUMERALS 1 conductive glass
2 area where cavity is formed
3 irradiated ion beam
4 cavity
5 molded article

DETAILED DESCRIPTION OF AN EXEMPLARY EMBODIMENT

The present invention will now be described on the basis of an exemplary embodiment. According to the present invention, a conductive glass is used as a substrate, and this substrate is irradiated with an ion beam to produce a mold for molding a plastic resin or the like on which at least one of a cavity and a core on the micrometer order to the nanometer order is provided.

In contrast, according to the present invention, such a decrease in the throughput and the processing dimensional accuracy due to charging caused by the progress of ion beam irradiation can be suppressed by using, as a substrate, a conductive vanadate glass containing vanadium pentoxide ($V_2O_5$) as a main component, which has been developed by a present inventor. In the present invention, a conductive glass having an electric conductivity in the range of $1.0 \times 10^{-1}$ to $1.0 \times 10^{-8}$ S/cm is used. As regards the conductive glass having such an electrical characteristic, a conductive glass composed of (5 to 20)BaO.(5 to 20)$Fe_2O_3$.$V_2O_5$ bal. can be used as the substrate. In order to impart a satisfactory conductivity to the glass, a glass obtained by melting and cooling the above composition is heat-treated in a temperature range of 300° C. to 500° C. for 10 to 180 minutes. For example, a heat treatment is performed at 460° C. for 30 minutes. Accordingly, a glass having an excellent conductivity of $4.0 \times 10^{-2}$ S/cm can be obtained. Furthermore, (1 to 10)$ReO_3$ may be added to the glass composition. The present invention may be implemented by electron beam irradiation.

In this case, it is important that a component having an atomic weight smaller than the atomic weight of the ion of an ion beam irradiated for processing should be included in the conductive glass. By adding such a component having an atomic weight smaller than the atomic weight of the ion of the ion beam irradiated on the substrate, the throughput of the mold can be markedly improved.

For example, when a mold is processed by irradiating Ga ions having an atomic weight of 69.723 on a substrate made of copper (Cu) having an atomic weight of 63.546, it takes several hours to ten hours to form a cubic cavity having ten micrometer sides while Ga ions are accelerated at 30 kV, which is a practical accelerating voltage. On the other hand, when phosphorus (P) having an atomic weight of 30.9737, which is smaller than the atomic weight of Ga, is added to copper (Cu) to prepare phosphor bronze, the throughput by ion beam irradiation is increased by 20 to 30 times the throughput in the case of copper (Cu), though phosphor bronze contains tin (Sn) having an atomic weight of 118. The present inventors believe that phosphorus (P) atoms are knocked off by collision of Ga ions and the phosphorus (P) atoms, thereby processing phosphor bronze with a high throughput. As described above, when an element having an atomic weight smaller than the atomic weight of the ion of an ion beam (an element that sufficiently obtains energy of the ion, thereby being easily separated) is contained in the substrate as a component, a processing by the ion beam can be performed with a high throughput. A conductive vanadate glass containing, as a main component, vanadium (V) having an atomic weight of 50.9415, which is smaller than the atomic weight of the Ga ion, i.e., 69.723, is used in the present invention.

EXAMPLE 1

A glass obtained by melting and cooling a composition composed of 15BaO.70$V_2O_5$.15$Fe_2O_3$ was heat-treated at 430° C. for 60 minutes. The resulting conductive glass having an electric conductivity of $4.0 \times 10^{-2}$ S/cm was used as a substrate. The substrate was irradiated with an ion beam obtained by accelerating Ga ions at 30 kV with a beam frame of 10 μm×100 μm and at a beam current in the range of 1 μA to 100 μA to form a groove having dimensions of 100 μm (width)× 1,000 μm (length)×2 μm (depth).

For comparison, a groove was formed as in Example 1 except that the material of the substrate was changed to a normal glass, phosphor bronze, or copper, and the processing time was compared with that in the present invention. The results are shown in Table 1.

TABLE 1

| Process material | Processing time | Remarks |
| --- | --- | --- |
| Conductive glass | 4 minutes 40 seconds | The present invention |
| Normal glass | 6 minutes 30 seconds | A trace of electrical discharge was observed. |
| Phosphor bronze | 38 minutes 50 seconds | |
| Copper | 7 hours 20 minutes 20 seconds | |

As is apparent from Table 1, according to the present invention, electrical discharge with the progress of ion beam irradiation did not occur and a mold processing could be performed with a throughput about 1.4 times that of the case of the normal glass.

EXAMPLE 2

A glass obtained by melting and cooling a composition composed of 15BaO.70V$_2$O$_5$.15Fe$_2$O$_3$ was heat-treated at 430° C. for 60 minutes. The resulting conductive glass having an electric conductivity of 4.0×10$^{-2}$ S/cm was used as a substrate. The substrate was irradiated with an ion beam obtained by accelerating Ga ions at 30 kV with a beam frame of 0.5 μm×0.5 μm and at a beam current in the range of 1 nA to 1 μA to form a groove having dimensions of 100 μm (width)×1,000 μm (length)×2 μm (depth).

For comparison, a groove was formed as in Example 2 except that the material of the substrate was changed to a normal glass, phosphor bronze, or copper, and the dimensional accuracy was compared with that of the present invention. The results are shown in Table 2.

TABLE 2

| Process material | Dimensional accuracy | Remarks |
| --- | --- | --- |
| Conductive glass | 0.5 μm to 1 μm | The present invention |
| Normal glass | 1 μm to 2 μm | A trace of electrical discharge was observed. |
| Phosphor bronze | 2 μm to 3 μm | |
| Copper | 2 μm to 3 μm | |

As is apparent from Table 2, according to the present invention, a mold processing could be performed without causing a problem of electrical discharge while a high dimensional accuracy was maintained. As in this example, even when the same beam frame, i.e., a beam frame of 0.5 μm×0.5 μm, was used, as the ion beam irradiation proceeded, misalignment between the beam and the substrate occurred depending on the type of substrate used. Consequently, it became difficult to process a minute shape with accurate dimensions. It is believed that when the normal glass was used, processability was degraded by the action of ions in the glass accumulated during continued ion beam irradiation, resulting in shifting of the position of the ion beam.

Table 3 shows the results of surface roughness of the cavities produced in Example 2 in which the surface roughness in the present invention is compared with that in the known arts. As shown in FIG. 1, the surface roughness was defined as the range between the maximum height of protruded portions and the minimum depth of recessed portions of surface irregularities.

TABLE 3

| Process material | Surface roughness | Remarks |
| --- | --- | --- |
| Conductive glass | 0.5 μm or less | The present invention |
| Normal glass | 0.5 μm to 1 μm | |
| Phosphor bronze | 1 μm or more | |
| Copper | 1 μm or more | |

EXAMPLE 3

Figure 2:
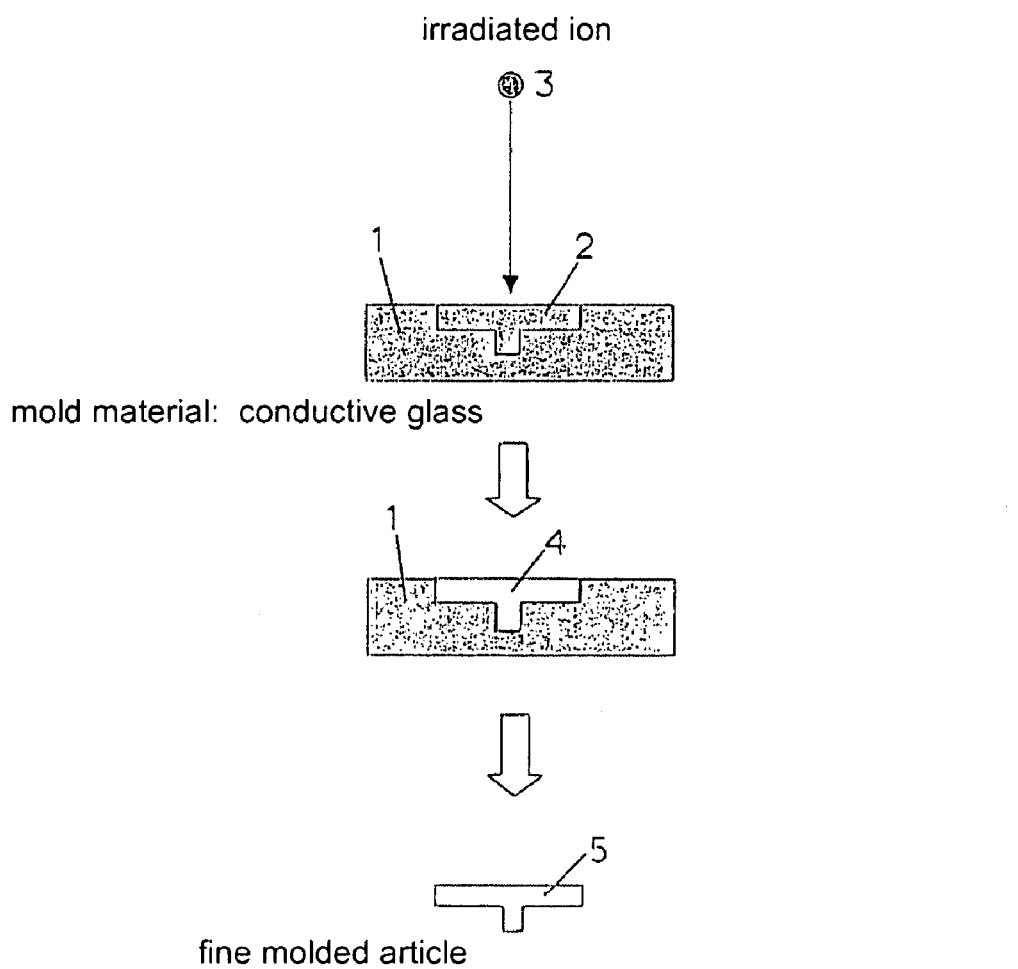
FIG. 2 includes schematic views illustrating a process of producing a mold according to an example of the present invention.

A glass obtained by melting and cooling a composition composed of 15BaO.70V$_2$O$_5$.15Fe$_2$O$_3$ was heat-treated at 430° C. for 60 minutes. The resulting conductive glass having an electric conductivity of 4.0×10$^{-2}$ S/cm was used as a substrate. The substrate was irradiated with an ion beam obtained by accelerating Ga ions at 30 kV, thereby performing the processing shown in FIG. 2 to produce a mold. In FIG. 2, reference numeral 1 indicates a conductive glass, and reference numeral 2 indicates an area where a cavity is formed. The area of a cavity 4 to be formed on the conductive glass 1 is shown by the longitudinal cross-section. Reference numeral 3 indicates an ion beam. In this example, the ion beam 3 is the same ion beam as that used in Example 1.

A polymer dissolved in a solvent was filled in the mold having the cavity 4 shown in FIG. 2 to produce a molded article 5. A plastic resin molded article having a high dimensional accuracy could be produced with a high accuracy.

INDUSTRIAL APPLICABILITY

The present invention can realize super-miniaturization of components and the like, and can supply a molded article of, for example, a plastic resin produced using a mold with a high dimensional accuracy and a high throughput. The present invention can be widely used in the field of the mold industry.

The invention claimed is:

1. A mold comprising a substrate made of a conductive vanadate glass containing vanadium pentoxide (V$_2$O$_5$) as a main component, and at least one of a cavity and a core formed by irradiating an ion beam of an atom having an atomic weight larger than the atomic weight of vanadium (V) on the surface of the substrate
    wherein the electric conductivity of the substrate is 4.0×10$^{-2}$ S/cm.

2. The mold according to claim 1, wherein the conductive vanadate glass further comprises ferric oxide (Fe$_2$O$_3$) and barium oxide (BaO) as components in addition to vanadium pentoxide (V$_2$O$_5$).

3. The mold according to claim 1, wherein the ion atom of the ion beam is a Ga ion.

4. The mold according to claim 2, wherein the ion atom of the ion beam is a Ga ion.

5. A method of producing a mold as recited in claim 1 comprising forming at least one of a cavity and a core by irradiating an ion beam of an atom having an atomic weight larger than the atomic weight of vanadium (V) on the surface of a substrate made of a conductive vanadate glass containing vanadium pentoxide (V$_2$O$_5$) as a main component
    wherein the electric conductivity of the substrate is 4.0×10$^{-2}$ S/cm.

6. The method of producing a mold according to claim 5, wherein a conductive vanadate glass further comprises ferric oxide (Fe$_2$O$_3$) and barium oxide (BaO) as components, in addition to vanadium pentoxide (V$_2$O$_5$), is used as the substrate.

7. The method of producing a mold according to claim 5, wherein the ion atom of the ion beam is a Ga ion.

8. The method of producing a mold according to claim 6, wherein the ion atom of the ion beam is a Ga ion.

9. A method of producing a molded article comprising filling a polymer, a polymer precursor, a biopolymer, a sol or gel substance, or a mixture thereof that is dissolved or dispersed in a solvent in the mold according to claim 1.

10. A method of producing a molded article comprising filling a polymer, a polymer precursor, a biopolymer, a sol or gel substance, or a mixture thereof that is dissolved or dispersed in a solvent in the mold according to claim 2.

* * * * *